Patented Mar. 11, 1930

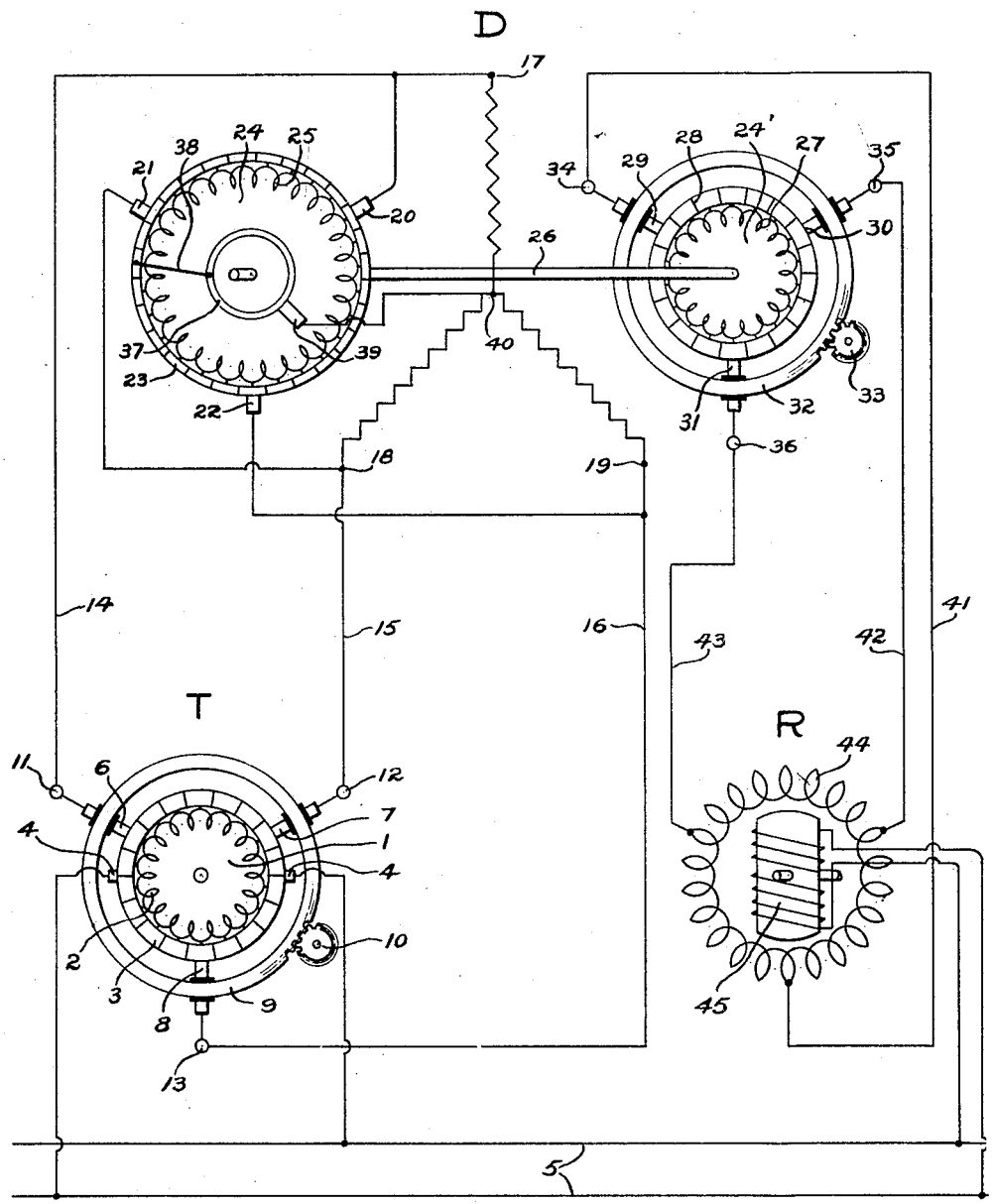

1,749,897

UNITED STATES PATENT OFFICE

HARRY L. TANNER, OF BROOKLYN, NEW YORK, ASSIGNOR TO FORD INSTRUMENT COMPANY, INC., OF LONG ISLAND CITY, NEW YORK, A CORPORATION OF NEW YORK

REDUCING HYSTERESIS EFFECTS IN ELECTRICAL APPARATUS

Application filed May 12, 1926. Serial No. 108,582.

This invention relates to reducing the effects of hysteresis in electrical apparatus, particularly in types of electrical apparatus in which hysteresis affects the proper operation of the apparatus aside from power losses.

One type of electrical apparatus of the character in which the effects of hysteresis are particularly objectionable is apparatus for changing the phase relation between two circuits connected thereby, such as is disclosed in my copending application Serial No. 754,738, filed December 9, 1924, and entitled Electrical differential. Apparatus of this character may be inserted intermediate the transmitters and receivers of an electrical signalling system, for example, for the purpose of introducing corrections into the signals transmitted from the transmitters to the receivers. In such apparatus, in which a rotating magnetic field is produced whereby portions of the apparatus are successively energized, the hysteresis effects will cause inadvertent errors due to the fact that the resultant magnetic retentivity or lagging flux will affect the ordinarily rapidly changing signals, whereby the corrections intended to be introduced through the differential are not accurately transmitted to the receiver motors.

It has been proposed to reduce hysteresis losses by superimposing an alternating magnetic field upon a hysteresis cycle that is produced by a slowly varying direct current field. Some experiments have been performed along these lines in which the alternating magnetic field has been produced by passing alternating current through coils separate from those through which the main energizing current passes, so that in effect the hysteresis has been reduced by superimposing a rapidly reversing magneto-motive force upon a slowly varying one.

It is the object of the present invention to reduce the effects of hysteresis in electrical apparatus in which such effects are detrimental, particularly from the point of view of accuracy or the like, by superimposing a rotating secondary electro-motive force, produced by and in the same electrical apparatus, upon the normal electro-motive force which is depended upon to produce the operation of the apparatus in its intended manner.

The particular nature of the invention, as well as other objects and advantages thereof, will appear most clearly from a description of certain preferred embodiments which, for purposes of illustration, will be shown and described in connection with a signal transmission system of the character disclosed in my copending application, Serial Number 724,912, filed July 8, 1924, and entitled Transmission system.

In the accompanying drawing, T indicates generally the transmitter, R the receiver, and D the electric differential intermediate the transmitter T and the receiver R, and to which the invention is particularly directed for the purpose of illustration. The transmitter T comprises an armature 1, consisting essentially of the winding 2 and commutator 3, which is mounted to rotate between suitable magnetic poles which have been omitted for the sake of simplicity. The commutator 3 is energized by a pair of brushes 4 connected to a direct current line 5. Engaging the commutator 3 at points 120° apart are three brushes, 6, 7 and 8 mounted upon but insulated from a toothed ring 9 adapted to be rotated by a pinion 10 to shift brushes 6, 7 and 8 with relation to commutator 3, which rotates with respect to the brushes, being driven by a suitable source of power, not shown. The brushes 6, 7 and 8 are respectively connected to slip rings 11, 12 and 13, which are represented by conventional symbols for the sake of simplicity.

From slip rings 11, 12 and 13, current is taken by brushes, not shown, and carried by conductors 14, 15 and 16, respectively, to points 17, 18 and 19, respectively of the Y-wound stator of the electrical differential D. The conductors 14, 15, and 16 are also connected with brushes 20, 21 and 22, respectively, which engage commutator 23 of armature 24 having a motor winding 25, so that the armature 24 will be driven by the current supplied by conductors 14, 15 and 16. The armature 24, which is shown divided into portions 24 and 24′ mounted upon a common shaft 26 for the sake of clearness, is also provided with a generator winding 27 inductively associated with motor winding 25 and connected to another commutator 28 from which current is taken by three brushes 29, 30 and 31 mounted upon but insulated from a toothed ring 32 adapted to be rotated by a pinion 33 to shift brushes 29, 30 and 31 with relation to motor commutator 28, which rotates with respect to the brushes, being mounted upon common shaft 26 driven by the motor part thereof. The brushes 29, 30 and 31 are respectively connected to slip rings 34, 35 and 36, which are represented by conventional symbols.

Armature 24 is provided with a slip ring 37 which is connected by means of conductor 38 to one of the bars of commutator 23, and which is engaged by a stationary brush 39 connected to the center or neutral point 40 of the stator of the differential D. It is thus evident that as commutator 24 revolves in a clockwise manner, for example, brushes 21, 20 and 22 are successively connected to the center 40 of the stator winding through conductor 38, slip ring 37 and brush 39, so that phases 18—40, 17—40 and 19—40 are each successively short-circuited and thus the remaining two phases of the winding are consequently successively additionally energized by the whole electromotive force, so that an additional rotating flux is impressed upon the windings without disturbing the normal relatively slowly varying operating flux upon which the rotating flux is superimposed. This additional energization of the successive phases of the stator winding has the effect of materially decreasing the objectionable hysteresis effects developed therein.

From slip rings 34, 35 and 36, current is taken by brushes, not shown, and carried by conductors 41, 42 and 43 to the stator winding 44 of receiver motor R having a rotor 45 connected to the direct current line 5. Ordinarily there is no shifting of brushes 29, 30 and 31 relatively to commutator 28 by means of adjusting pinion 33, but such shifting may be effected for the purpose of adjusting the position of the indicator of receiver R with reference to the position of the indicator of transmitter T for the purpose of introducing corrections or the like into the transmitted signals at some intermediate station where the differential D may be located. If no corrections are to be introduced, the rotary movements of brush ring 9 of the transmitter T are relayed unaltered through differential D to the stator of receiver R, producing a rotating field therein which causes the rotor 45 to follow the movements of brush ring 9 of transmitter T. The strength of the additional rotating flux is much weaker than that of the normal flux that is rotated by the setting of the transmitter T, and, therefore, the receiver rotor 45 remains under the dominance of the stronger flux and is positioned in accordance with the transmitter T and any correction that is effected through the differential D.

Owing to the rotating flux superimposed upon the normal flux in the stator of the differential D, it is evident that a secondary electromotive force will be induced in winding 27 of armature 24', which consists of a rapidly varying electromotive force superimposed upon the normal slowly varying electromotive force, and this in turn will cause a rapidly varying flux to be superimposed upon the normal electromotive force on stator winding 44 of receiver motor R. This has the effect of reducing the hysteresis effects in the receiver motor R also. Accordingly, it is further evident that there are two separate and distinct electromotive forces impressed upon the entire circuit comprising the stator and winding 27 of differential D and receiver motor R, whereby the hysteresis effects are materially reduced in that circuit.

It is to be understood that the foregoing description and illustration disclose only a preferred embodiment of this invention and that it may be similarly applied to other forms of electrical apparatus and is readily susceptible to alterations in form and detail without departing form the spirit of the invention within the scope of the appended claims.

What is claimed is:

1. In means for reducing the effects of hysteresis in electrical apparatus having relatively moving elements, normal connections between said elements and to a source of electromotive force, and successive additional connections between said elements whereby a varying additional electromotive force is impressed upon successive portions of one of said elements.

2. In means for reducing the effects of hysteresis in electrical apparatus having relatively moving elements, permanent connections between said elements and to a source of electromotive force, and changing connections between said elements whereby an electromotive force is superimposed on successive portions of one of said elements.

3. In a means for reducing the effects of hysteresis in electrical apparatus having relative moving elements, the combination of permanent connections between said elements and to a source of electromotive force, and means whereby portions of one of said elements are successively short-circuited.

4. In a means for reducing the effects of hysteresis in electrical apparatus having relatively movable members, the combination of permanent connections between said members and to a source of electromotive force, and means for superimposing an additional momentary electromotive force on successive portions of one of said members.

5. In a means for reducing the effects of hysteresis in electrical apparatus having relatively movable windings, means for impressing an electromotive force upon said windings, auxiliary connections between said windings, and means whereby said auxiliary connections superimpose an additional electromotive force upon successive portions of one of said windings.

6. In a means for reducing the effects of hysteresis in electrical apparatus having a stator and a rotor, means for energizing the stator and the rotor, permanent connections between said stator and rotor and said means, and variable connections between said stator and said rotor whereby portions of said stator are successively and additionally energized.

7. In a means for reducing hysteresis effects in electrical apparatus having field windings, means for impressing a normal electromotive force upon said windings, and means for superimposing an additional rotating electromotive force upon successive portions of said windings.

8. In a means for reducing the hysteresis effects in electrical apparatus having an armature and field windings, connections between said armature and field windings, and means actuated by said armature for short-circuiting successive portions of said field windings.

9. In means for reducing the hysteresis effects in electrical apparatus, the combination of a Y-wound stator, on armature associated therewith, means for energizing the stator and the armature and means controlled by rotation of said armature for impressing an additional electromotive force upon successive phases of said stator.

10. In electrical apparatus, the combination of a stator provided with windings, a rotatable armature having a bar commutator, connections between said armature and stator, means for energizing the rotor and producing a rotating flux in the stator at will, a slip ring on said armature, connections between said ring and the bars of said commutator, a stationary brush engaging said ring, and a connection between said brush and a neutral point of said stator whereby an additional rotating flux is produced in said stator to reduce the hysteresis effect.

11. In electrical apparatus, the combination of a wound stator, a rotatable armature associated therewith, connections between said stator windings and said armature, means for energizing said armature and producing a rotating flux in said stator at will and auxiliary connections between said stator and armature whereby an additional rotating flux is produced in said stator to reduce the hysteresis effects.

12. In electrical apparatus having a commutator rotor and a wound stator, means for energizing the rotor and the stator, means for reducing hysteresis effects in said stator comprising a slip ring rotatable with said rotor, a stationary brush contacting therewith and connected to a neutral point of said stator, and connections between said ring and the commutator of said rotor whereby successive portions of said stator are short-circuited and the remaining portions thereof receives additional electromotive forces.

13. In means for reducing the effects of hysteresis in electrical apparatus, the combination of a source of polyphase current of variable frequency, a rotor connected to the source, a stator provided with a plurality of windings having a common point and terminals connected to the source and means for varying the potential of the common point of the windings with respect to their terminals.

14. In means for reducing the effects of hysteresis in electrical apparatus, the combination of a source of polyphase current of variable frequency, a rotor connected to the source, a stator provided with a plurality of windings having a common point and terminals connected to the source and means for successively connecting the common point of the windings to their terminals.

In testimony whereof I affix my signature.
HARRY L. TANNER.